Figure 1:
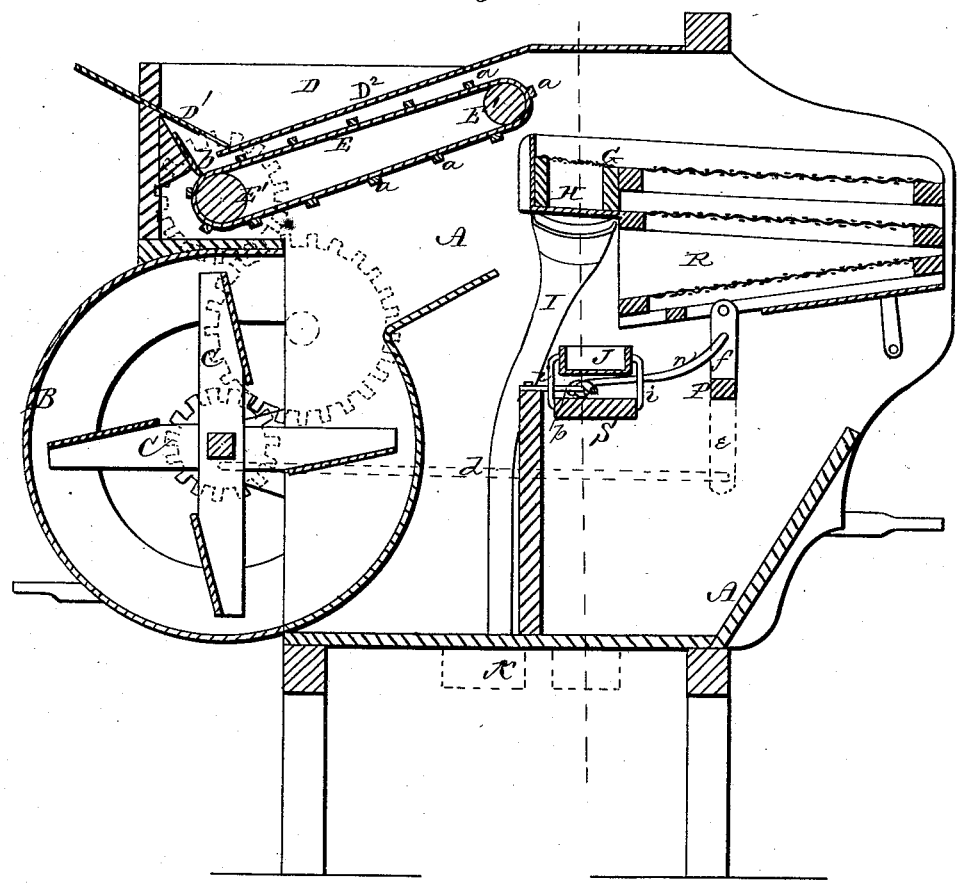

2 Sheets--Sheet 1.

J. B. LOBDELL & M. F. BARTLETT.
Grain-Separator.

No. 162,669. Patented April 27, 1875.

WITNESSES
Henry N. Miller
O. L. Everih

INVENTOR
Jacob B. Lobdell
Monroe P. Bartlett
per
Alexander Mason
ATTORNEYS

THE GRAPHIC CO. PHOTO-LITH. 39 & 41 PARK PLACE, N.Y.

2 Sheets--Sheet 2.
J. B. LOBDELL & M. F. BARTLETT.
Grain-Separator.
No. 162,669. Patented April 27, 1875.
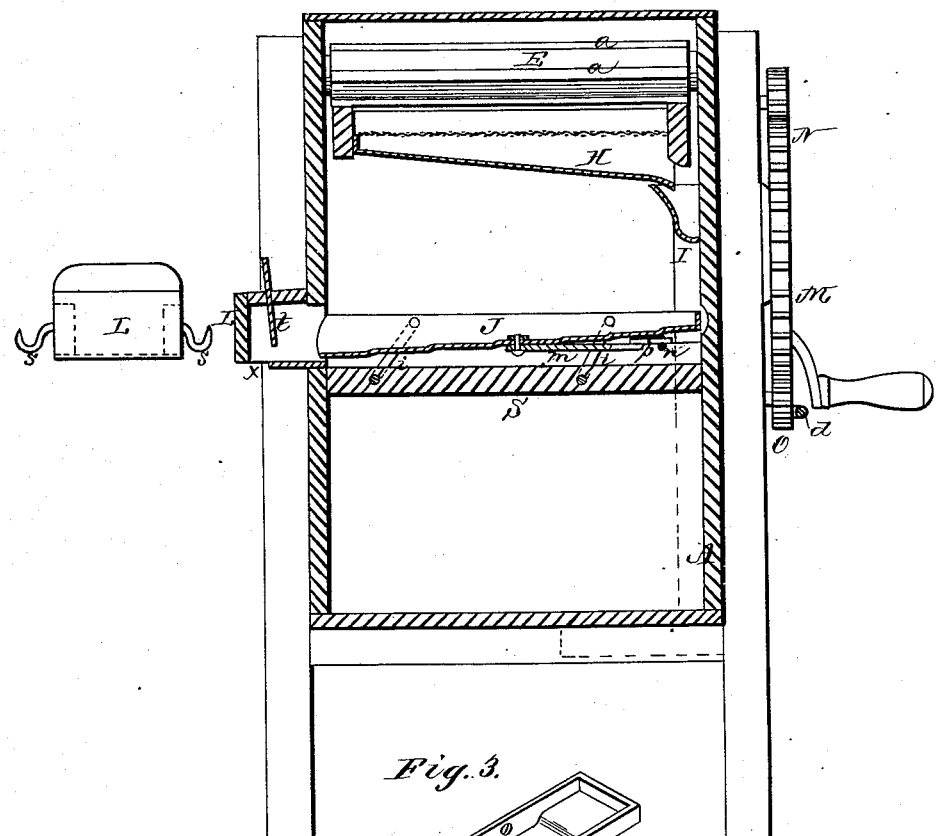
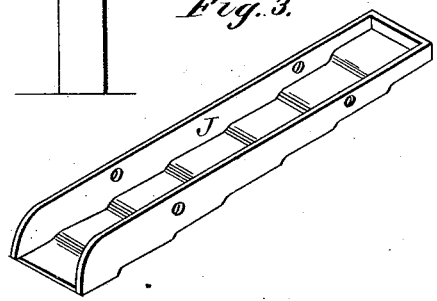
WITNESSES
Henry N. Miller
C. L. Everk
INVENTOR
Jacob B. Lobdell,
Monroe F. Bartlett
per
Alexander Mason
ATTORNEYS
THE GRAPHIC CO. PHOTO-LITH. 39 & 41 PARK PLACE, N.Y.

UNITED STATES PATENT OFFICE.

JACOB B. LOBDELL AND MONROE F. BARTLETT, OF BATTLE CREEK, MICH.

IMPROVEMENT IN GRAIN-SEPARATORS.

Specification forming part of Letters Patent No. 162,669, dated April 27, 1875; application filed January 19, 1875.

*To all whom it may concern:*

Be it known that we, JACOB B. LOBDELL and MONROE F. BARTLETT, of Battle Creek, in the county of Calhoun and in the State of Michigan, have invented certain new and useful Improvements in Grain-Separators; and do hereby declare that the following is a full, clear, and exact description thereof, reference being had to the accompanying drawings and to the letters of reference marked thereon, making part of this specification.

The nature of our invention consists in the construction and arrangement of a fanning-mill or grain-separator, as will be hereinafter more fully set forth.

In order to enable others skilled in the art to which our invention appertains to make and use the same, we will now proceed to describe its construction and operation, referring to the annexed drawings, in which—

Figure 1 is a longitudinal vertical section of our fanning-mill. Fig. 2 is a transverse vertical section of the same, and Fig. 3 is a perspective view of the discharge-spout.

A represents the frame of our fanning-mill, with fan-case B and fan C revolving therein. D is the hopper at the front end of the frame, provided with a slide, D¹, by which the flow of grain is easily regulated. The grain from the hopper falls onto an endless revolving apron, placed in an inclined position close beneath and parallel to the inclined side D² of the hopper, and passing around rollers E' E', and provided with transverse cleats *a a*, as shown. Over the lower roller E' is placed a flexible cut-off, *b*, to prevent the grain from falling down; but as it passes from the hopper it spreads over the entire width of the apron, and is carried up by the same, and is let fall upon the forward end of the upper screen G. This end of the screen is made of very fine gauze, in order to let through at this point all the smaller seeds, which pass down into a receptacle, H, and down through a tube or passage, I, into a drawer, K, which is shown in dotted lines in Fig. 1. The grain falls from the apron E in a thin sheet, allowing the blast from the fan full sweep thereon to carry off all dust, dirt, &c., and the smaller seed passes through the forward end of the upper screens, as described, while the coarser grain passes onward, falling on the usual coarse screen, and successively passing through the ones usually provided for the same purpose. After leaving the last screen the clean grain is dropped onto a vibrating spout, J, the bottom of which is constructed, as shown in Fig. 3, in somewhat of step form. At every revolution of the "shaker," hereinafter described, the spout J is lifted up, propelling the grain toward the receiving-bag on the outlet L. M is the driving cog-wheel, mounted on a stud projecting from the side of the frame, and provided with a suitable crank for revolving the same. The wheel M gears with a cog-wheel or pinion, N, on the journal of the lower apron-roller E', and also with a cog-wheel or pinion, O, on the end of the fan-shaft, thus imparting the necessary motions to the apron and fan.

The cog-wheel or pinion O is, by a rod or pitman, *d*, connected with an arm, *e*, projecting at right angles from one end of a bar, P, which has suitable journal-bearings in the sides of the frame A, and is located about midway under the shoe R, in which the screens are placed. The bar P thus obtains a rocking motion with the revolution of the cog-wheel or pinion O.

From the bar P extend two arms, *f f*, the upper ends of which are pivoted to the sides of the shoe R, near the center. The rear end of the shoe is, by pivoted straps *h*, connected to the sides of the frame A. By the rocking of the bar P the shoe R, with its screens, thus obtains an up-and-down and backward-and-forward motion.

The spout J is supported upon vibrating rods *i i* from a board, S, underneath, and it is connected, by a loose rod, *m*, with one end of a pivoted elbow-lever, *p*, the other end of said lever being connected, by a loose rod, *n*, with one of the arms *f*, whereby the spout obtains a vibrating motion.

The end of the spout J extends into the outlet-box L, which is attached to the outside of the frame A, and has an aperture, *x*, in the bottom at the outer end. In this box is a sliding gate, *t*, to cut off the grain when one bag is being taken off and another put on. The outlet-box L is, on its sides, provided with hooks *s* for the attachment of the bags.

Having thus fully described our invention, what we claim as new, and desire to secure by Letters Patent, is—

1. The slatted endless belt E, arranged close beneath the inclined side $D^2$ of the hopper D, and parallel therewith, for the purpose of evening and regulating the feed of the grain to the screens, as set forth.

2. The combination of the vibrating spout J, made in step form and carried on vibrating rods $i$, the loose connections $m$ $n$, elbow-lever $p$, and arm $f$, all constructed and arranged substantially as set forth.

In testimony that we claim the foregoing we have hereunto set our hands this 8th day of December, 1874.

JACOB B. LOBDELL.
MONROE F. BARTLETT.

Witnesses:
MARTIN METCALF,
D. H. METCALF.